United States Patent [19]

Huignard et al.

[11] 4,199,783

[45] Apr. 22, 1980

[54] OPTICAL SYSTEM FOR RECORDING AND READING AN INFORMATION ON A TAPE

[75] Inventors: Jean P. Huignard; Jean-Claude Lehureau, both of Paris, France

[73] Assignee: Thomson-CSF, Paris, France

[21] Appl. No.: 900,008

[22] Filed: Apr. 25, 1978

[30] Foreign Application Priority Data

Apr. 29, 1977 [FR] France ............................ 77 12951

[51] Int. Cl.² .......................... G02F 1/00; G02F 1/11
[52] U.S. Cl. ................................. 358/132; 346/76 L; 358/127; 358/201; 365/234
[58] Field of Search ............... 358/129, 130, 132, 201, 358/127; 346/76 L, 108; 365/234

[56] References Cited

U.S. PATENT DOCUMENTS

| | | | |
|---|---|---|---|
| 3,534,166 | 10/1970 | Korpel | 358/129 |
| 3,657,473 | 4/1972 | Corcoran | 358/132 |
| 3,841,733 | 10/1974 | Ebersole | 179/100.3 Z |

OTHER PUBLICATIONS

Motoki et al., Direct Laser-Beam Recording of Color Television Signals on Color Print Film, SMPTE Journal, vol. 86, 2/77, pp. 71-73.

Primary Examiner—Stuart N. Hecker
Attorney, Agent, or Firm—Cushman, Darby & Cushman

[57] ABSTRACT

An optical system for recording n information signals on a photosensitive tape in the form of a discontinuous track made up of parallel track sections by means of n light beams having a two states modulated intensity, being simultaneously deflected by an acousto-optical deflector and focusing on the tape in the form of n equidistant spots aligned in a direction x. The combination of the deflection and a translation movement of the tape produces a scanning movement of said n spots in a direction perpendicular to x. The same system is made for the reading of the information transcribed on the tape, the beams being then not modulated, by means of photodetector means which receive the light emerging from the tape and provide information signals in relation with the physical modifications obtained on the tape during the recording.

14 Claims, 10 Drawing Figures

OPTICAL SYSTEM FOR RECORDING AND READING AN INFORMATION ON A TAPE

The present invention relates to optical recording and reading systems for recording an information on a tape in the form of a discontinuous track made up of parallel track sections and for reading the recorded information.

Optical recording and reading systems of known kind utilise for the scanning of the tape, mechanical deflection means of the rotating mirror kind, which operate at a very high frequency in order to achieve a recording rate which is compatible in particular with video requirements. Mechanical systems are generally complex, heavy and expensive. On the other hand, they tend to wear out. Also known are holographic procedures but these require a complex optical system and a laser source exhibiting a high level of coherence.

The object of the present invention is to make an optical device for recording and reading, which produces results of good quality, is inexpensive, light and of low bulk, said device being applicable in particular to television signals with a view to utilisation for reporting purposes. The device in accordance with the invention employs an acousto-optical deflector for the scanning function, which is more reliable and simpler to operate than mechanical deflection means. This deflector is associated with an optical system comprising n light sources which, in the case of the recording function, are modulated respectively in on/off fashion by n electrical signals which result from the conversion of the video information. The tape is thus scanned by n spots in the form of parallel track sections, the directions of scanning being perpendicular to the direction of the array of spots.

For a better understanding of the present invention and to show how the same may be carried into effect, reference will be made to the ensuing description and the attached drawing in which.

An acousto-optical deflector excited by means of a transducer with an electrical signal S of frequency F, and illuminated by a lightbeam of wavelength $\lambda$ at an angle of incidence equal to the Bragg angle $\beta$, gives rise to a beam deflection through an angle $\alpha=2\beta$, defined by $\sin \alpha/2 + \frac{1}{2}(\lambda \nu)/F$, where $\nu$ is the speed of the ultrasonic waves in the deflector. In addition, if the frequency F is varied about a mean value $F_o$ with a total sweep of $\Delta F$, the number R of directions which the deflector is capable of resolving, taking into account diffraction, is $R=(L/\nu)\Delta F$, where L is the length of the acoustic line. F is limited by the pass band of the deflector and, by the nature of the materials, the number N varies between 100 and 1000 for a wavelength L around 1 cm.

Optical recording or read-out of a piece of information on or from a tape, requires the use of a device for the transverse scanning of a lightbeam modulated by the information, each information element being materialised upon the tape by a point and the assembly of points forming a succession of track sections. Mechanical deflection devices are limited in terms of frequency and, in certain cases, do not enable a sufficient information rate to be achieved for example to record or readout a piece of video information. In this context, it is of interest to use an acousto-optical deflector operating at a frequency f corresponding to the desired passband. The limitations on these deflectors are concerned with the number of resolved points along a scanned line. Since this number R is too low in particular to make it possible to record or read-out a video signal, the invention provides for the use of several lightbeams which are simultaneously deflected by a single acousto-optical deflector. The information is previously split up into n binary components modulating in lightsources so that groups of track section each comprising R points are obtained on the tape.

Figure 1:
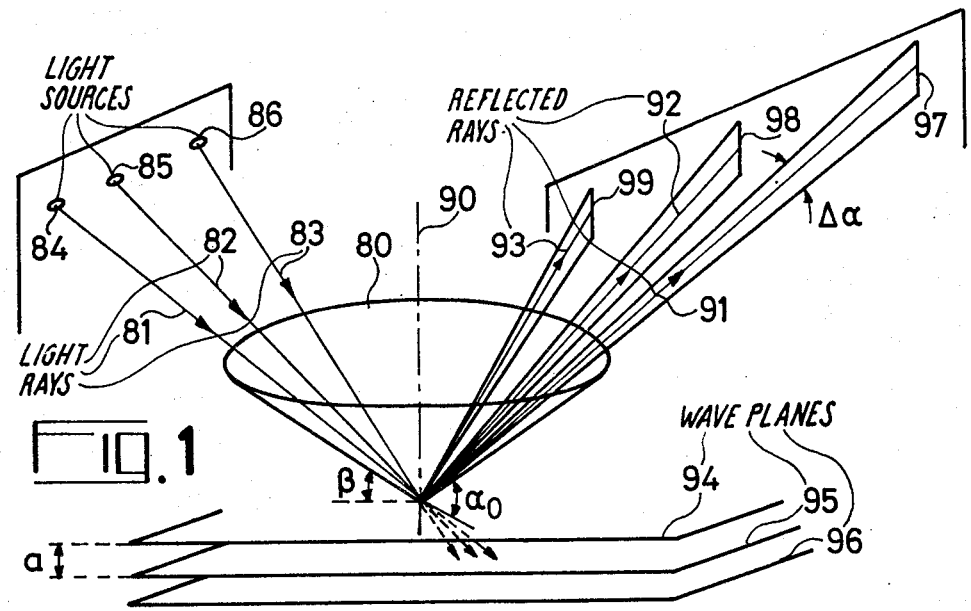
FIG. 1 is a diagram explaining the deflection of n light beams by an acousto-optical deflector.

From a consideration of FIG. 1 it will be seen how it is possible to satisfy the Bragg condition for several separate lightbeams. Three parallel planes 94, 95 and 96 have been shown, which are the planes of acoustic waves forming a regular network of semi-reflective planes at a pitch interval a. In order for a light ray to be reflected strongly, it is necessary for it to make an angle $\beta$ equal to the Bragg angle, with the wave planes. It must therefore be oriented in accordance with a straight-line generatrix of a cone 80 whose axis 90 is perpendicular to the planes and whose apex half-angle is $(\pi/2)-\beta$. Three light rays 81, 82, 83 have been shown, which satisfy this condition and emanate from three sources 84, 85 and 86. The three sources are aligned in a direction parallel to the planes. The three rays 81, 82, 83 are reflected, forming respectively the rays 91, 92, 93 which, in relation to the incident rays, make an angle ranging between $a_o+(\Delta a/2)$ and $a_o+\Delta a/2$ where $a_o=2\beta$. The images of the sources 84 and 85 and 86 are respectively 97, 98 and 99 and are likewise aligned in a direction parallel to the planes. The direction of deflection is perpendicular to the planes. Thus, in accordance with the invention, the n lightbeams deflected by the same deflector will be imaged on the tape in the form of n spots aligned in a direction perpendicular to the direction of scanning of the tape by the n spots.

Figure 2:
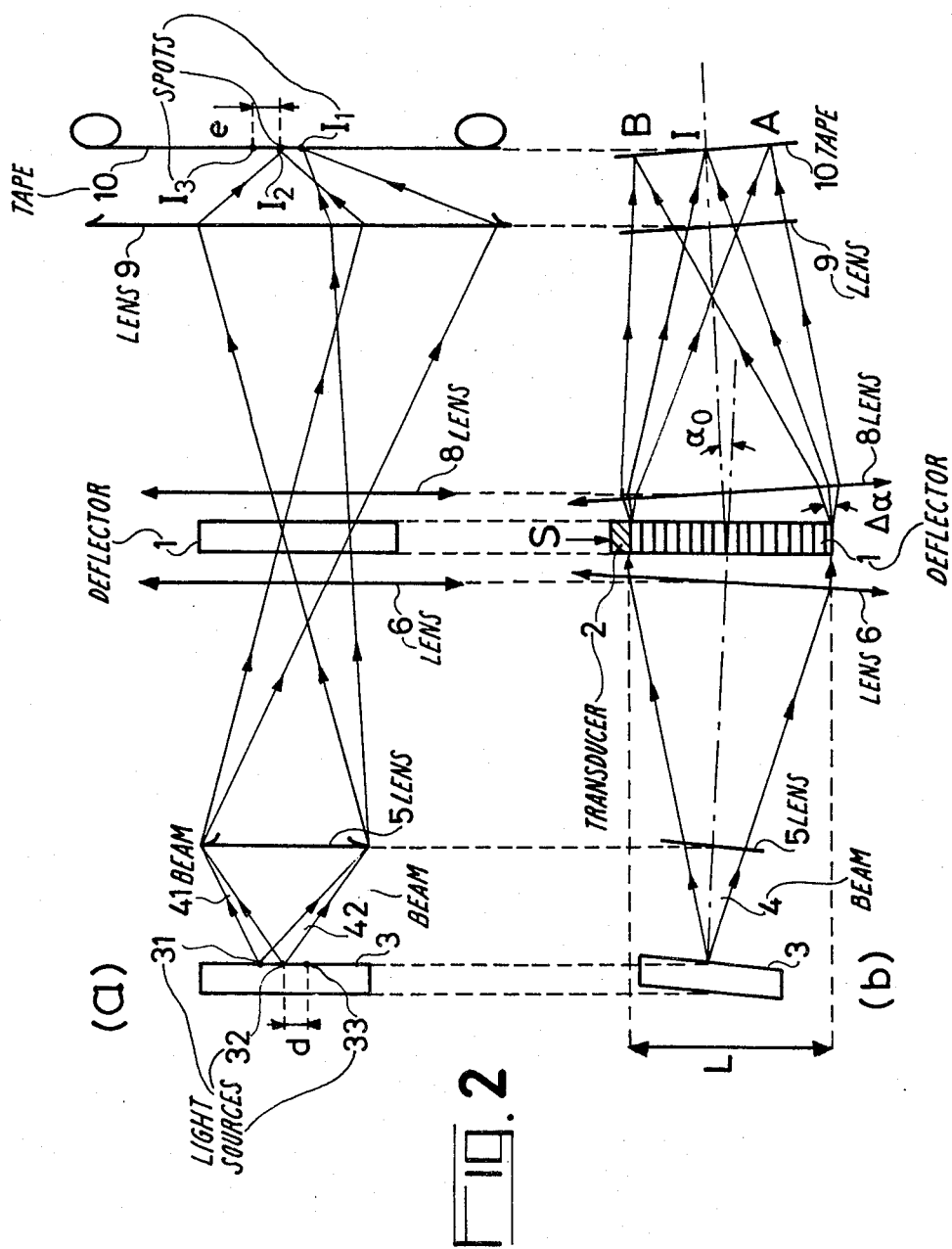
FIG. 2 is a schematic illustration of the device in accordance with the invention.

FIG. 2 is a schematic illustration in the form of two sections of an optical recording device in accordance with the invention. The section (a) illustrates an array of laser sources 3, comprising for example three semiconductor laser diodes, 31, 32 and 33 spaced at regular intervals d. From each diode there issues a lightbeam. Two of these have been shown: 41 and 42. In the path of the beams there are arranged, by way of non-limitative example, a cylindrical lens 5 which makes the beams converge and a convergent spherical lens 6 which does not modify the path of the beams in the plane of section, these beams passing at a short interval from the centre. The beams 41 and 42 converge on an acousto-optical deflector 1 arranged in such a manner that its acoustic waveplanes are in the plane of section so that the beams are not deflected in this plane. Behind the deflector there are a convergent spherical lens 8 and a cylindrical lens 9 arranged in such a manner as to make the beams converge on a tape 10 in the form of spots $I_1$, $I_2$, $I_3$ spaced at uniform intervals e.

On the section (b) perpendicular to that (a), the same elements have been shown as at (a). In the plane of the section, the beams 41, 42, 43 are superimposed and are referenced by (4), the cylindrical lenses do not act upon the illustrated beam 4. The spherical lens 6 makes the beams parallel. The combination of the lenses 5 and 6 thus makes it possible to produce flattened and parallel beams at the deflector 1, the angle of incidence of the direction of the beam relative to the acoustic wave planes being equal to the Bragg angle in order to produce deflection (this angle is generally less than 1°). The deflector 1 is excited by a signal S by means of a transducer 2. The signal S has a frequency F varying between $F_o-(\Delta F/2)$ and $F_o+(\Delta F/2)$ in accordance with a sawtooth function, at the frequency f. The beams are deflected through an angle $\alpha$ varying between $\alpha_o-(\Delta\alpha/2)$ and $\alpha_o+(\Delta\alpha/2)$. The combination of the lenses 8 and 9 provide the focusing of the beams on the tape. The superimposition of the spots $I_1$, $I_2$, $I_3$ defines the point I which scans a track section which lies between two points A and B. The arrangement of the sections on the tape, obtained when the latter is moved at a constant rate depends upon the position of the tape relative to the optical system. The ensuing description sets out the design, based upon the schematic illustration of FIG. 2, of devices which make it possible to obtain different track arrangements.

Figure 3:
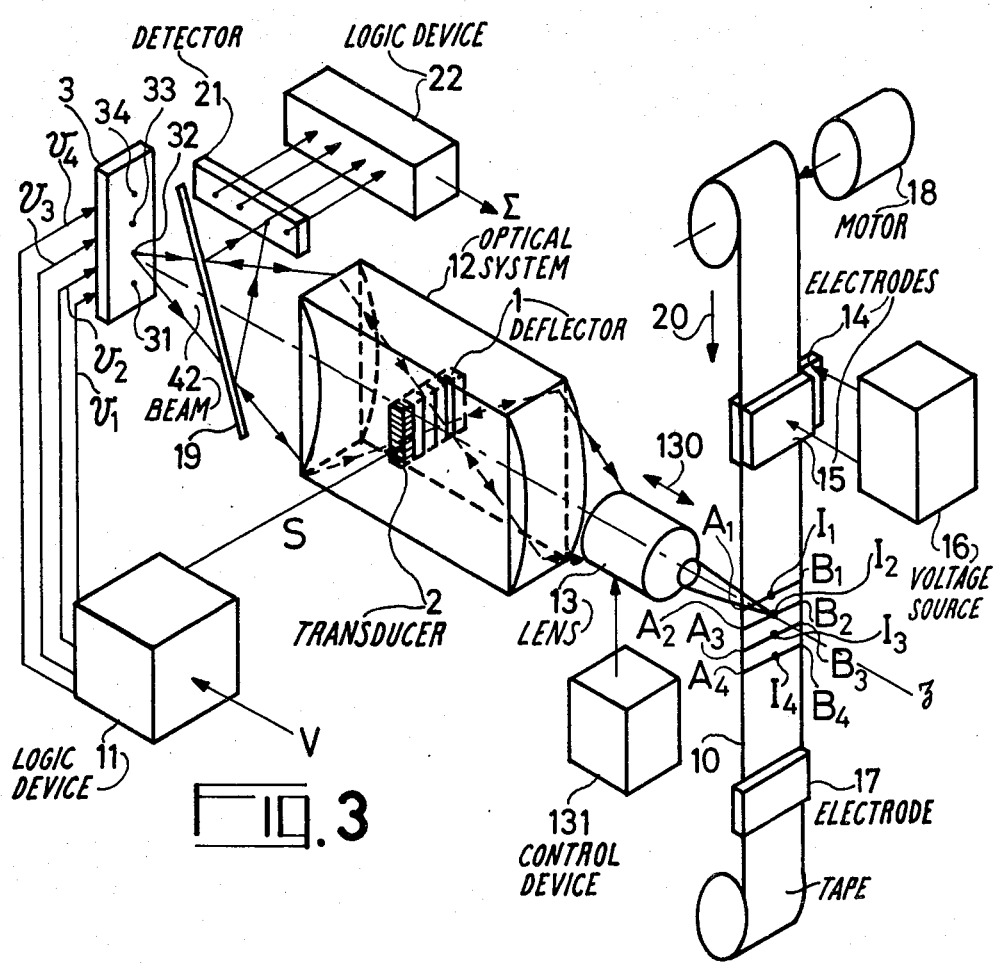
FIG. 3 illustrates an embodiment of the device in accordance with the invention.

A first device has been shown in FIG. 3. The device can be used either for recording or for reading out information, as required. The information V is converted by a device 11 into four synchronous components $V_1$, $V_2$, $V_3$, $V_4$. These components respectively modulate four laser sources 31, 32, 33, 34 aligned in an array 3, in on/off fashion. The light-beams (only one, 42, issued from the source 32 has been shown) enter the optical system 12 comprising the lenses 5, 6, 8, 9 and the deflector 1 of FIG. 2. Behind the optical system 12 there is arranged an objective lens 13 whose magnification makes it possible to create the desired interval e between spots (the intervals are typically $e=5$ $\mu$m, $d=15$ $\mu$m). In addition, a focusing control device 131 can be provided, making it possible to displace the objective lens along the optical axis, z, of the system, as symbolised by the arrow 130, in order to compensate for defects in the flatness of the tape. The tape 10 is arranged in the focal plane of the objective lens, perpendicularly to the axis z, so that its longitudinal axis is perpendicular to the scanning direction and thus parallel to the direction of the alignment of sources 31 to 34 and hence likewise the spots $I_1$ to $I_4$. The spots respectively scan the track sections $A_1B_1$, $A_2B_2$, $A_3B_3$, $A_4B_4$ in a direction transversely of the tape. The signal S exciting the transducer 2 is a sawtooth signal of frequency f. It is produced by the device 11. In the case of a piece of video information, it may stem from the line-synchronisation signal. A motor 18 provides a translation of the tape 10 at a constant rate in a direction parallel to its longitudinal axis, symbolised by the arrow 20.

Figure 4:
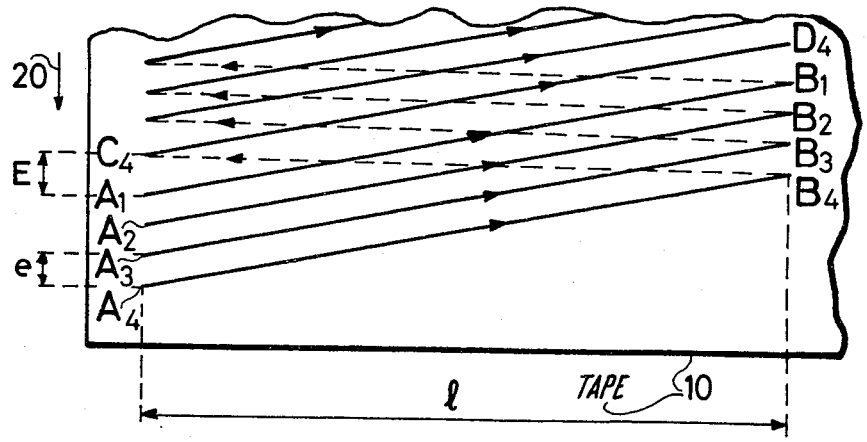
FIG. 4 illustrates an arrangement of track sections produced by the device shown in FIG. 3.

The combination of the scanning and the translation motions makes it possible to bring about a track arrangement of the kind shown in FIG. 4. In this Figure, the inclination of the track sections has been very much exaggerated. This inclination results from the longitudinal movement of the tape and is in reality around 1 milliradian. Taking video as an example, the scanning time, which is equal to the line duration $T=1/f=64$ $\mu$s, breaks down into a time $T_1$ during which recording takes place and a time $T_2$ which is the scanning flyback time and which can be made to coincide with the blanking interval of the video signal. Considering an acousto-optical deflector of interaction length a, in which the ultrasonic waves propagate at the speed v, $T_2=a/v$, and this is typically 5 $\mu$s. This value is sufficiently small compared with the total time T. The distance e between two adjacent spots is limited by the resolving power of the optical system 12 and the objective lens 13. So is the resolution $\epsilon$ on one and the same track section. E being the distance which separates the last track section corresponding to one line ($A_1B_1$) and the first track section corresponding to the next one ($C_4D_4$), the translation speed of the tape and the scanning time T are linked by the relationship $E+(n-1)e=V_oT$, where n is the number of spots (up till now, n has been assumed equal to 4.). The length of the track sections, obtained in the direction of scanning, is $l=R\times\epsilon$, where R is the number of points resolved by the deflector. Considering n channels, the total number of bits which can be recorded per line is equal to $R\times n$. In reality, the number of useful points, that is to say the number of points corresponding to the effective time $T_1$, is equal to $$Rn\left(1-\frac{T_2}{T}\right).$$

By way of example, for $R=300$ points, $n=8$, $T_2=5$ $\mu$s, the rate obtained is around 2200 bits per line and this corresponds to a good quality recording. For $e=E=\epsilon=5$ $\mu$m, a speed $V_o$ of 65 cm per second can readily be achieved and the length of the track sections is $l=1.5$ mm. The tapes currently used generally being very much wider, it is possible to obtain several recordings within the width of the tape. At each end, the recording is interrupted to enable the lateral displacement of the tape. The duration of a recording for a tape of length 150 meters and width 3 cm, is around 4 mm. Seven or eight recordings can be made on one and the same tape.

Various kinds of data carriers can be used for optical recording. Bearing in mind the power furnished by the light sources and the optical and acousto-optical efficiencies of the deflector, it is possible to determine the sensitivity which the material of the tape must have. By way of non-limitative example, when using gallium-arsenide laser sources, power in the infrared spectrum of the order of 5 mV is available for each source. The efficiency of the deflector, that is to say the ratio between the diffracted luminous intensity and the incident luminous intensity, for an angle of incidence equal to the Bragg angle, is about 10% for a lead-molybdate (Pb Mo 04) deflector and infrared radiation. The time taken to record a point is around 0.2 $\mu$s so that the energy used in recording a point is around 0.1 nJ. A material of medium resolution, that is to say one which makes it possible to record around 200 points per mm on a track section, i.e. with $\epsilon$ about 5 $\mu$m, will need a sensitivity greater than 2.5 cm$^2$ per mJ. Silver materials are suitable for this kind of application but they require chemical developing. Photothermoplastic materials are easier to use. For example, the thermoplastic material known by the brand name "Kalle" can be used, and the characteristics specified for this material by the manufacturers are as follows:

tape dimensions: 30–60 m length by 400 mm width;
sensitivity in the near-infrared- 10 cm$^2$/mJ;
resolution for optimum response: 800 points per mm;
amplitude of local deformation under point illumination: 1 to 2 $\mu$m.

The method of recording on a thermoplastic material covered with a photoconductive material, comprises the following stages:

deposition of charges by corona effect, on the zone which is to be recorded;
illumination of the zone which is to be recorded, by one or more spots in order to modify the charge state;
development of the recorded material by instantaneous heating, in order to produce micro-reliefs at the surface of the tape.

The three stages of the process are performed simultaneously as FIG. 3 shows. The tape 10 is arranged between two electrodes 14 and 15 connected to a voltage source 16 in order to bring about permanent charge of the tape. After recording, the tape is heated locally by a heating electrode 17, to a temperature of around 70° C. It is possible to erase the tape several times by heating it uniformly to a temperature greater than the developing temperature. In addition, there are thermoplastic materials available in which recording is performed by ablation, and this requires powerful lightsources.

The device illustrated in FIG. 3 can also be used for reading the information previously recorded on the tape 10 with the configuration shown in FIG. 4. FIG. 3 illustrates by way of example a reader unit operating by reflection. The n lightsources 31 to 34 are not modulated in this application. They do not need to be as powerful as the sources used for recording. For this mode of operation it will be seen that a semi-reflecting plate 19 is provided. The lightbeams are reflected by the tape. They pass back through the objective lens and the optical system in accordance with the law of inverse reflection of light, and are reflected by the plate 19. The n beams are detected respectively by n detectors located on a plate 21 and respectively conjugate with the lightsources relative to the plate 19. Each detector emits an electrical signal which is a function of the luminous intensity which it receives. The n electrical signals are processed by a transmission circuit 22 which reforms the signal $\Sigma$ carrying the information recorded on the tape. The reflective read-out procedure is similar to that used with a video disc. It is based upon the phenomenon of diffraction of the lightbeam when the latter encounters a modification in the state of the surface of the data carrier (disc or tape). By analogy with the video disc, it is easy to conceive of a reading device operating by transmission. The plate with the photodetectors, 21, is then located in order to receive the light transmitted by the tape. The assembly formed by the plate 19 and the plate carrying the photodetectors 22, can be used, and this includes the recording application, in order to bring about control of the focusing or the tracking functions, in accordance with the procedures currently used with video discs.

The configuration described above makes it necessary to arrange the spots very close together. The distance between the spots can be increased by adopting the track configuration shown in FIG. 5, this being a variant embodiment of that shown in FIG. 4 and likewise being obtainable using the device shown in FIG. 3. In this configuration, two adjacent spots, for example I$_1$ and I$_2$, describe track sections A$_1$B$_1$ and A$_2$B$_2$ which are not adjacent one another on the tape and which are separated by a distance e$=$(n$-$1)b where b represents the distance between two adjacent track sections for example A$_1$B$_1$ and C$_2$D$_2$. The translation speed V$_o$ and the scanning time T are linked by the relationship $nb=V_oT$. Keeping for b the same value as before, where b was equal to e, the distance between spots e and therefore the distance between sources d is multiplied by n$-$1. In this way, a value of d can be obtained which is compatible with the techniques of design of semiconductor lasers.

Figure 5:
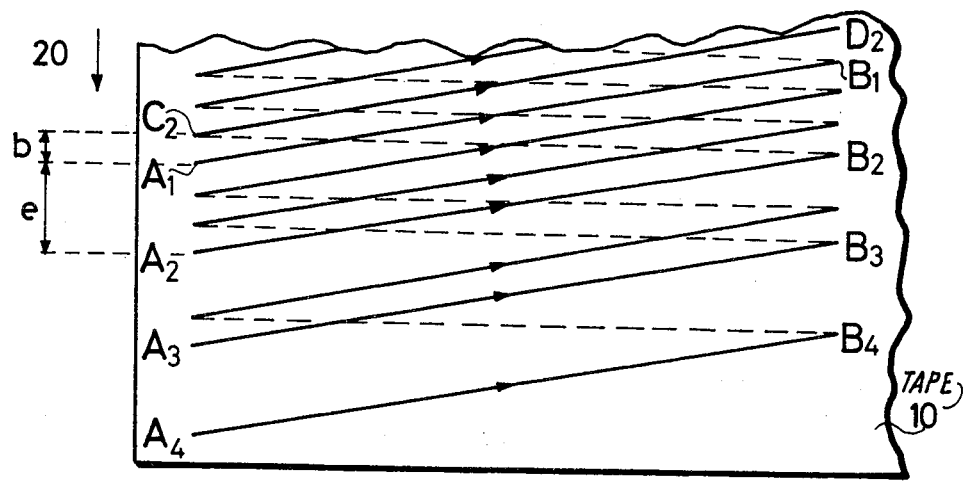
FIG. 5 illustrates a variant embodiment of the arrangement of the track sections obtained using the device shown in FIG. 3.
Figure 6:
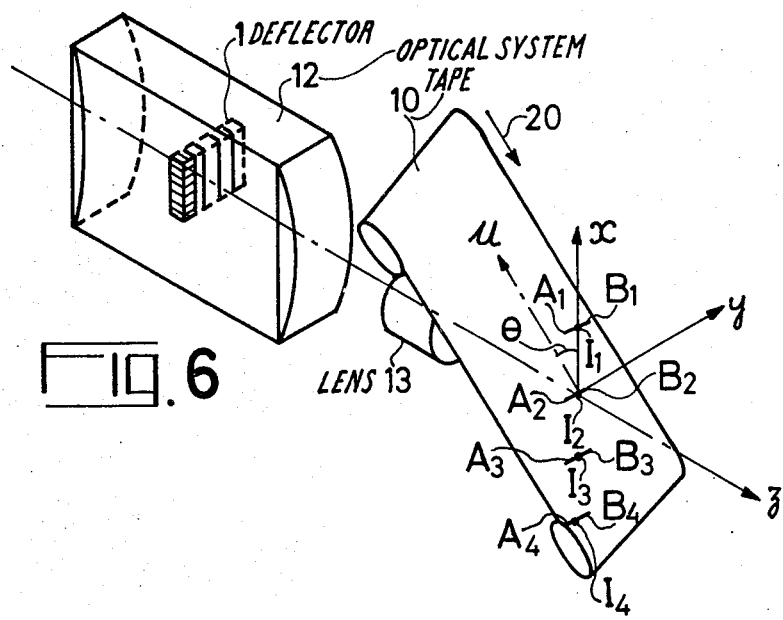
FIG. 6 illustrates a variant embodiment of the invention.

The configurations shown in FIGS. 4 and 5, obtained using the device shown in FIG. 3, mean that only a small part of the width of the tape is occupied and this requires interruption of the recording in order to enable a change to be made from range to range. Using the device shown in FIG. 6, better utilisation of the surface of the tape is achieved. The only difference in relation to FIG. 3, concerns the orientation of the tape relative to the elements of the device. All that have been shown are the optical system 12 and the objective lens 13. The tape is still arranged in the focal plane of the objective lens, perpendicular to the axis z. Its transverse axis makes an angle $\theta$ with the scanning direction y so that the longitudinal axis u makes an angle $\theta$ with the direction of alignment of the spots x.

Figure 7:
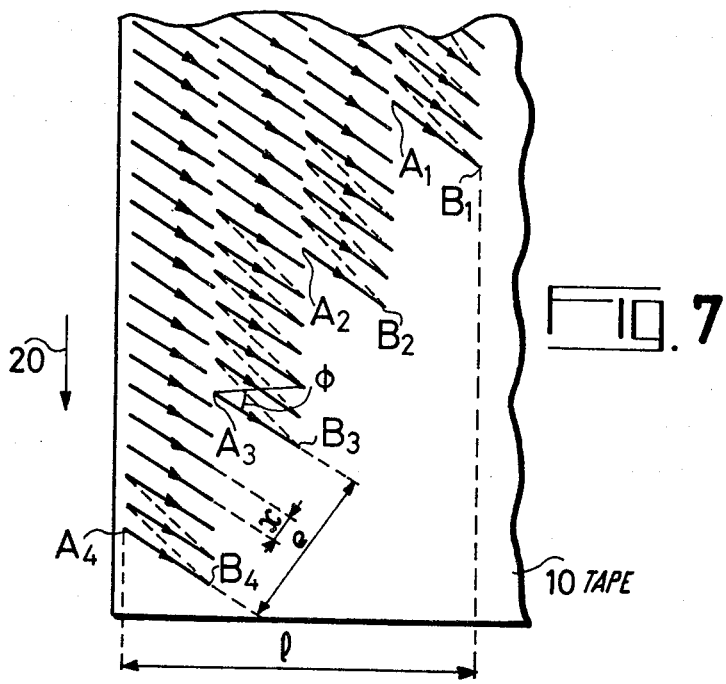
FIG. 7 illustrates an arrangement of track sections obtained using the device shown in FIG. 6.

The arrangement of the track section on the tape has been shown in FIG. 7. In this Fig., the angle resulting from the longitudinal movement of the tape has not been shown because this angle is very small and can be neglected in relation to the angle $\theta$. The orientation of the tracks $\phi$, approximately equal to the angle $\theta$, must not exceed a value which depends upon the number n of sources. In other words, since X is a dimension of the field of the optical system associated with the objective lens, then the condition A$_4$B$_1 \leq$ X must be satisfied. Simple geometric considerations lead to the condition governing $\phi$, namely that R$\epsilon \sqrt{1+(R-1)^2 \cot g^2 \phi} \leq$ X. The translation speed of the tape is V$_o$=f(e/cos$\phi$). The width of tape occupied is l$=$n R $\epsilon$ sin $\phi$. Typically, we obtain the following values: X=3 mm, $\epsilon$=2.5 $\mu$m, R=300, n=8, e=4 $\mu$m, f=15 625 Hz. The optimum angle $\phi$ is around 60°; V$_o$=12.5 cm/s; l=5.2 mm.

Figure 8:
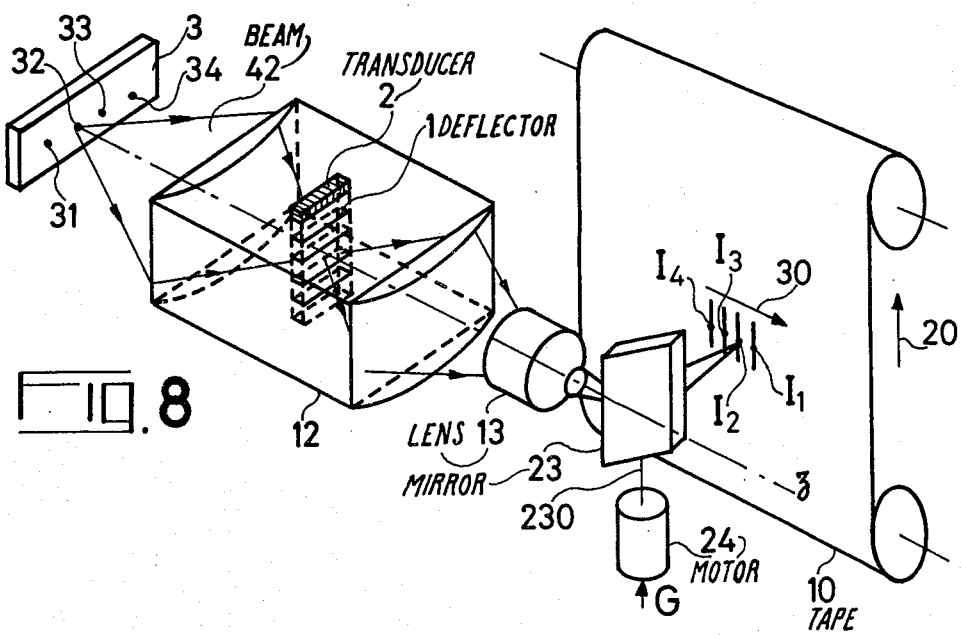
FIG. 8 illustrates another variant embodiment of the invention.
Figure 9:
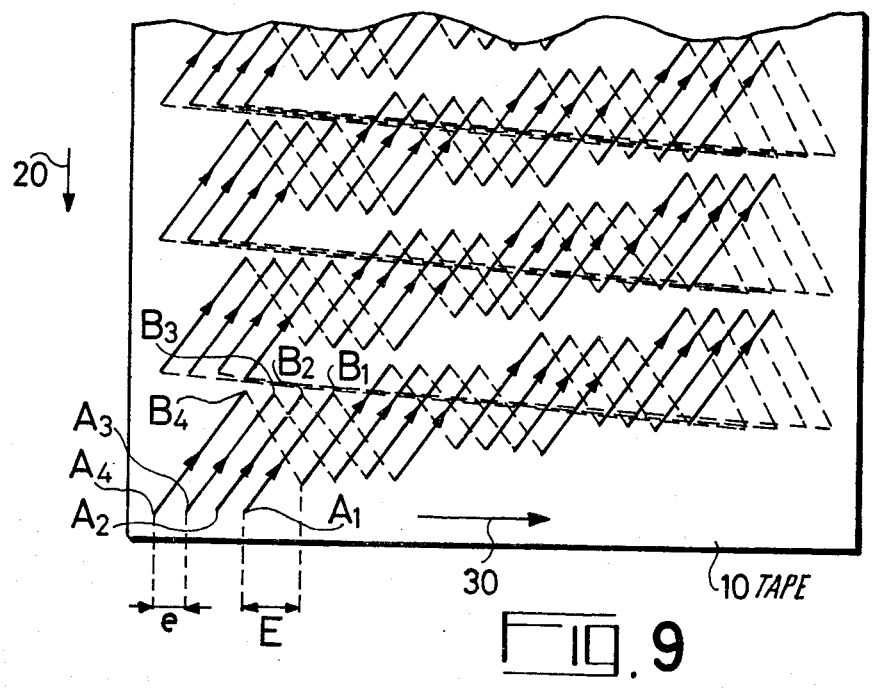
FIG. 9 illustrates an arrangement of track sections obtained using the device shown in FIG. 8.

Another method of utilising the whole of the width of the tape is put into effect using the device of FIG. 8. This device comprises mechanical deflecting means which effect scanning in a direction perpendicular to the scanning function performed by the acousto-optical deflector. The elements of this device carry the same references as in FIG. 3. Behind the objective lens 13, there is arranged a mirror 3 which can pivot under the control of a motor 24 synchronised by a signal G, about an axis 230 perpendicular to the direction of alignment of the sources and to the axis z. The tape is arranged in the conjugate plane of the focal plane of the objective lens, considered in relation to the mirror 23. Its longitudinal axis is perpendicular to the direction of alignment of the sources, and therefore to the direction of alignment of the spots. The n scanning operations performed by the acousto-optical deflector therefore take place along longitudinal axes and the scanning performed by the mirror takes place along a transverse axis symbolised by the arrow 30. In this way, the configuration of FIG. 9 is obtained, this resulting from the combination of the two scanning motions and the translation of the tape in the direction 20. Over the width of the tape there are thus obtained p sets of n track sections. In the Fig. n=p=4. The number p, that is to say the number of lines recorded over the width of the tape, is limited by the field size X. Since E is the distance separating the last track section of one set from the first track section of the next set, the condition $p[(n-1)e+E] < X$ must be satisfied. Typically, X=3 mm, e=E=2.5 μm. For n=4, p is about 300 lines. Therefore, it is possible to record a complete frame of a television image, within the width. The signal G is then the frame synchronisation signal and transverse scanning flyback takes place during the blanking interval of the video signal at the beginning and end of each frame. The values of the scanning frequency and of the flyback time, are compatible with the possibilities of mechanical deflection means. The movement of the mirror can furthermore be controlled in order to ensure that the track is well followed during read-out in order to compensate for tape expansion.

Figure 10:
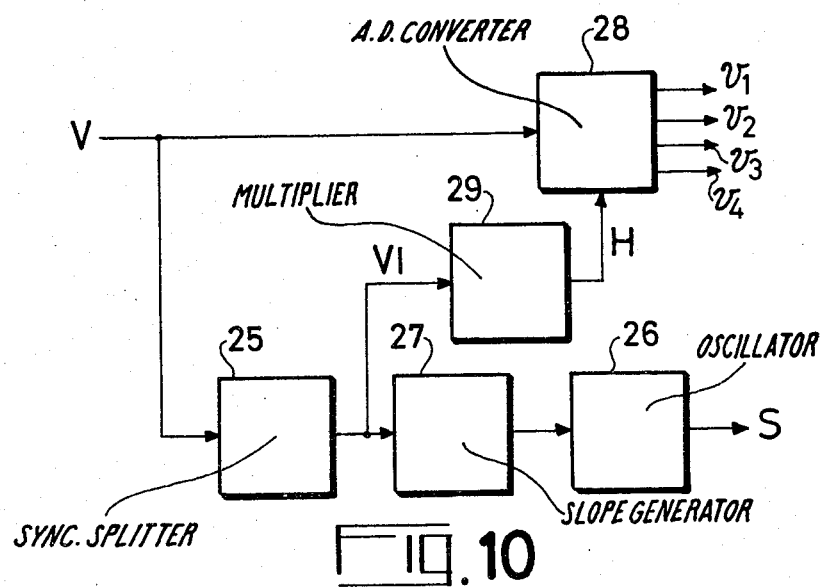
FIG. 10 illustrates an embodiment of the device for converting the video information.

FIG. 10, concerned with application to the recording of television signals, illustrates an embodiment of the device 11 which makes it possible to convert the video information V into n synchronous digital components $v_1, v_2 \ldots v_n$, and also to provide the control signal S for the acousto-optical deflector. The video information V comprises the luminance signal and the various synchronisation signals (line and frame). The line synchronisation signal can be extracted using a synchronisation splitter device 25. Pulses at the frequency f—15 625 Hz are obtained, this constituting the signal VI. A multiplier 29 makes it possible to obtain a pulse signal H of frequency $f' = R \times f$, where R is the total number of points which can be recorded during the time of an acousto-optical scan. The frequency f' therefore represents the rate which the digital components $v_1 \ldots v_n$ must have. The signal V is sampled and coded in the form of n bits by an analog-digital converter 28 controlled by the clock signal H. One of the bits can be allocated to synchronising and this may for example be concerned with the reproduction of the signal H so that it is possible to provide a synchronisation signal during read-out. The same bit can also be used for recording the sound signal. To obtain the control signal S, an oscillator 26 is used whose frequency is controlled by a slope generator 27 intended to convert the pulses VI into a sawtooth signal of frequency f. By arranging between the splitter 25 and on the one hand the slope generator 27 and on the other the multiplier 29, a frequency multiplier, a signal S whose frequency is equal to mf is obtained. The sampling frequency can thus be increased by a factor m, and this widens the pass band.

What we claim is:

1. An optical recording and reading system for recording information signals on a light-sensitive tape and for subsequently reading the recorded information, said system comprising light emissive means for providing n beams of coherent light, projection means for focusing said beams on said tape into n equidistant spots aligned in a direction x, acousto-optical deflection means interposed between said emissive means and said projection means, producing a simultaneous recurrent displacement of said n spots in a direction perpendicular to x, a transport mechanism providing a translation movement of said tape in a direction u; the combination of said recurrent displacement and said translation movement giving a first scanning movement of said n spots relative to said tape along a succession of parallel track sections; said system further comprising modulator means intended for the recording of n information signals providing a two states intensity modulation of said n beams respectively in respect of said n information signals; said intensity modulation producing optically detectable modifications of a physical characteristic of said tape; said system further comprising photodetector means intended for the reading of said physical modifications, receiving the light emerging from said tape and providing n information signals in respect with said modifications.

2. A system as claimed in claim 1, wherein said emissive means comprise an array of n aligned equidistant laser sources respectively emitting n divergent beams having parallel axis.

3. A system as claimed in claim 2, wherein said acousto-optical deflection means comprise an acousto-optical deflector of which the acoustic wave planes are parallel to the direction of alignment of said n sources and excitation means producing a sawtooth variation of the angle of deflection of said deflector at a constant scanning frequency f.

4. A system as claimed in claim 3, wherein said emissive means further comprise a cylindrical lens and a spherical lens converting respectively said n divergent beams into n flattened and parallel beams having an angle of incidence relative to the acoustic wave planes of said deflector equal to the Bragg angle.

5. A system as claimed in claim 4, wherein said projection means comprise a spherical lens, a cylindrical lens and an objective lens converting respectively the n beams emerging from said acousto-optical deflector into n convergent beams focusing on said tape, the rate between the inter-distance of said n spots and the inter-distance of said n sources being predetermined.

6. A system as claimed in claim 2 for recording and reading a television signal, said system further comprising electronic means for converting said television signal into n synchronous digital signals, said scanning frequency f being equal to k times the line-frequency of said television signal, k being an integer.

7. A system as claimed in claim 6, further comprising mechanical deflecting means interposed between said projecting means and said tape providing a second scanning movement of said n spots in a direction different from that of said first scanning movement and with a frequency equal to the frame-frequency of said television signal.

8. A system as claimed in claim 7, wherein said mechanical deflecting means comprise a pivoting mirror.

9. A system as claimed in claim 1, wherein said direction x is parallel to said direction u.

10. A system as claimed in claim 9, wherein the inter-distance of said n spots is equal to the distance between two consecutive track sections.

11. A system as claimed in claim 9, wherein the inter-distance of said n spots is greater than the distance between 2 consecutive track sections.

12. A system as claimed in claim 1, wherein said direction x makes an angle θ other than 0 with said direction u, the track sections respectively followed by said n spots forming n sets belonging to adjacent ranges of said tape.

13. A system as claimed in claim 1, further comprising mechanical deflecting means interposed between said projecting means and said tape providing a second scanning movement of said n spots in a direction different from that of said first scanning movement.

14. A system as claimed in claim 13, wherein said mechanical deflecting means comprise a pivoting mirror.

* * * * *